United States Patent
Beveridge et al.

[15] 3,683,597
[45] Aug. 15, 1972

[54] EVAPORATION LOSS CONTROL

[72] Inventors: Thomas R. Beveridge, Spencerport; Ernst L. Ranft, Webster, both of N.Y.

[73] Assignee: General Motors Corporation, Detroit, Mich.

[22] Filed: Sept. 17, 1970

[21] Appl. No.: 73,128

Related U.S. Application Data

[63] Continuation-in-part of Ser. No. 887,868, Dec. 24, 1969, abandoned.

[52] U.S. Cl. ...................55/316, 55/387, 55/419, 55/476, 55/513, 55/518, 55/519, 55/DIG. 28, 123/119 R, 123/136
[51] Int. Cl. ..............................................B01d 50/00
[58] Field of Search........55/316, 387, 419, 420, 476, 55/512, 513, 514, 515, 516, 517, 518, 519, DIG. 28; 123/119 R, 119 A, 119 B, 136

[56] References Cited

UNITED STATES PATENTS

| | | |
|---|---|---|
| 2,586,672 | 2/1952 | Lambertsen..................55/387 |
| 3,191,587 | 6/1965 | Hall...........................123/136 |

FOREIGN PATENTS OR APPLICATIONS

| | | | |
|---|---|---|---|
| 545,089 | 5/1942 | Great Britain...............55/513 |

*Primary Examiner*—Dennis E. Talbert, Jr.
*Attorney*—J. L. Carpenter and C. K. Veenstra

[57] ABSTRACT

In a system for controlling the loss of fuel vapor from a vehicle fuel tank, the fuel tank vents are connected to the upper portion of a canister containing a quantity of fuel vapor adsorbing carbon retained under compression therein. The upper portion of the canister is also connected to the induction system of the vehicle engine, the bottom of the canister being open to atmosphere so that air is drawn through the carbon and the fuel vapor purged during engine operation. The canister is molded from nylon, the top being formed so that vapor from the fuel tank is discharged into the mid-portion of the canister. The top and bottom of the canister include molded grids and filter pads to prevent loss of carbon from the canister, and in one embodiment a nylon screen additionally serves to prevent carbon loss from the bottom of the canister. The top of the canister may contain appropriate valve structure to control fuel tank pressure and vapor flow.

13 Claims, 15 Drawing Figures

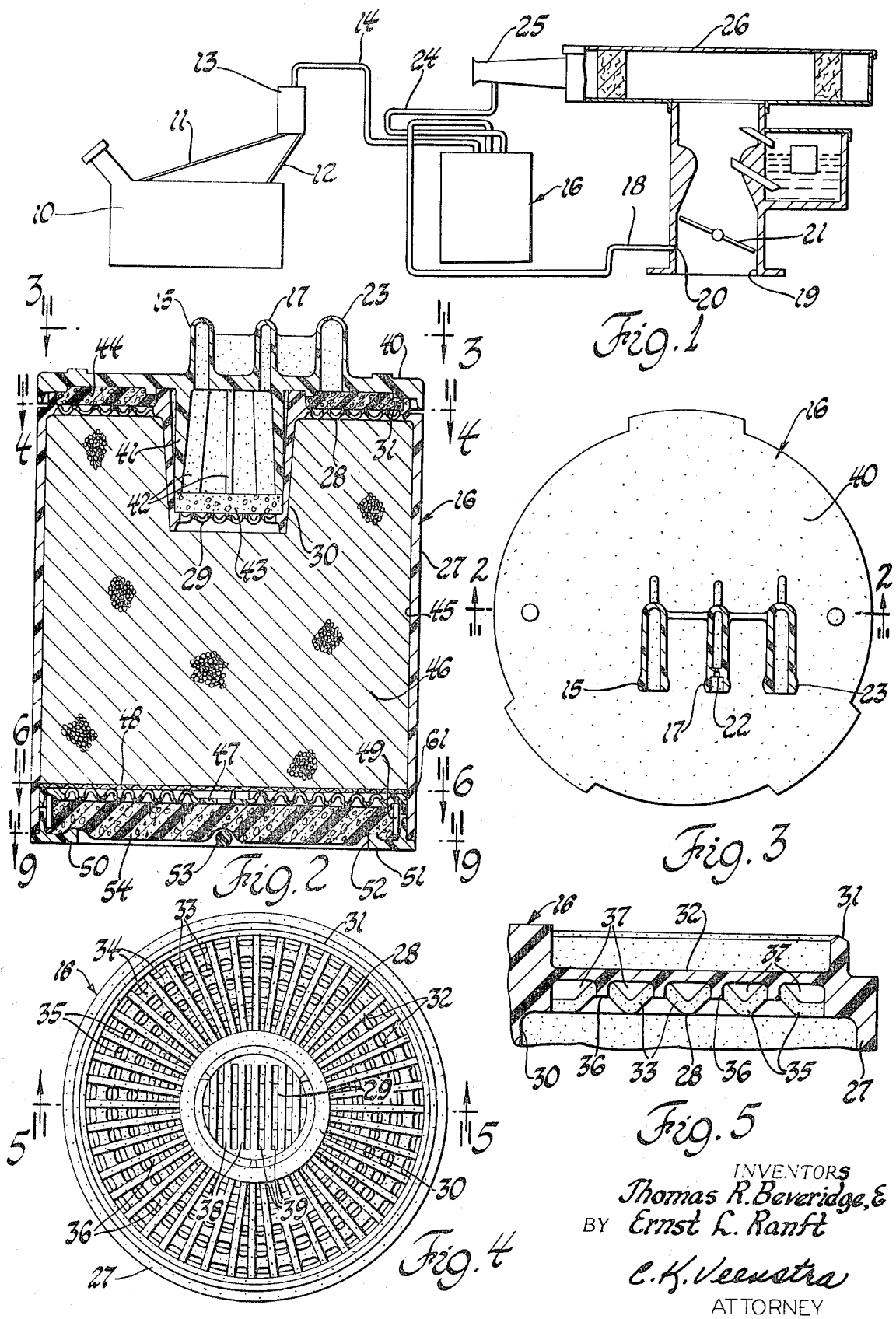

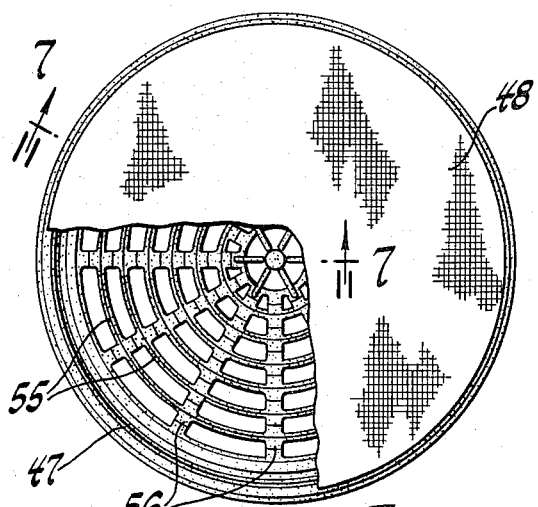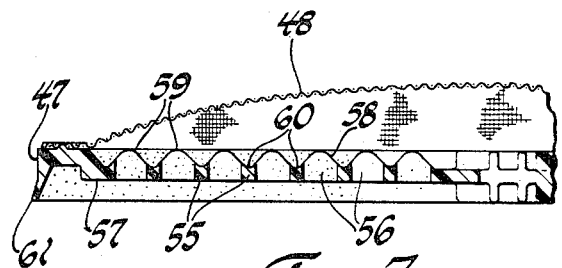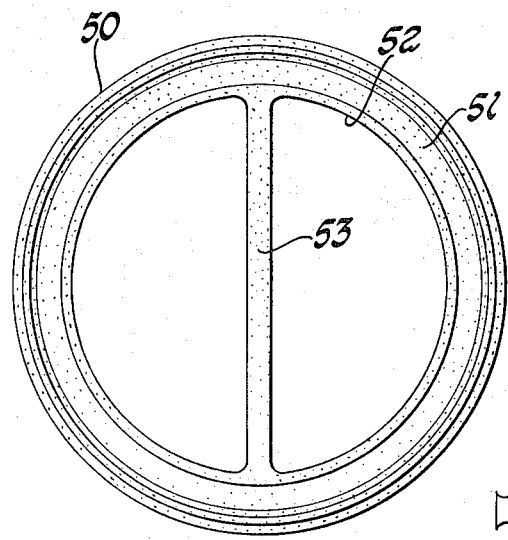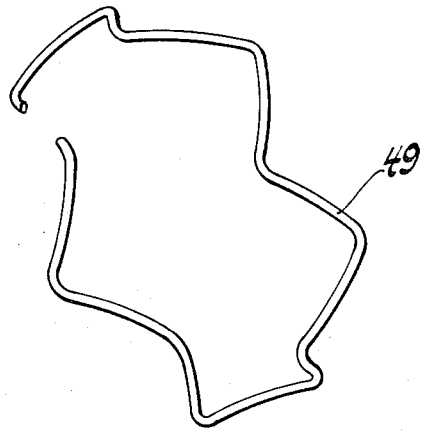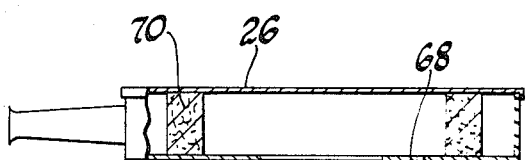

Patented Aug. 15, 1972

INVENTORS
Thomas R. Beveridge, &
BY Ernst L. Ranft

C. K. Veenstra
ATTORNEY

INVENTORS.
Thomas R. Beveridge, &
BY Ernst L. Ranft

C. K. Veenstra
ATTORNEY

EVAPORATION LOSS CONTROL

This application is a continuation-in-part of copending application Ser. No. 887,868 filed Dec. 24, 1969 and now abandoned.

SUMMARY OF THE INVENTION

In one of the systems found to be most advantageous for controlling loss of fuel vapor from vehicle fuel tanks, a canister containing activated charcoal is connected to the fuel tank vents and stores the fuel vapor emitted therefrom. During vehicle operation, the fuel vapor is purged from the canister into the engine induction system.

This invention provides a canister having a construction particularly suited for use in such a system.

The details as well as other objects and advantages of this invention are shown in the drawings and are set forth in the detailed description of the preferred embodiment.

SUMMARY OF THE DRAWINGS

FIG. 1 is a schematic diagram of a system employing the canister in the manner described;

FIG. 2 is an enlarged sectional view of the canister in elevation, taken along line 2—2 of FIG. 3, showing the construction of the canister assembly;

FIG. 3 is a plan view of the canister, taken in section along line 3—3 of FIG. 2, showing the inlet and purge fittings of the canister;

FIG. 4 is a plan view of the upper portion of the canister body member, indicated generally by line 4—4 of FIG. 2, the cover member of the canister assembly having been removed to show the top grid structure;

FIG. 5 is a sectional view taken along line 5—5 of FIG. 4, further enlarged to show details of the top grid structure;

FIG 6 is a plan view of the bottom closure of the canister, removed from the canister assembly but indicated generally by line 6—6 of FIG. 2, showing the nylon screen and bottom grid structure;

FIG. 7 is a sectional view taken along line 7—7 of FIG. 6, further enlarged to show the bottom grid structure, the sealing lip, and the nylon screen;

FIG. 8 is a pictorial view of the wave spring which biases the bottom closure against the carbon in the canister;

FIG. 9 is a plan view of the spring seat and filter retainer disposed at the base of the canister, removed from the canister assembly but indicated generally by line 9—9 of FIG. 2;

FIG. 10 is a schematic diagram of another system employing the features of the canister shown in FIG. 2;

FIG. 14 is a schematic diagram of an additional system employing a canister with similar features; and FIG. 15 is an enlarged axial sectional view of the canister shown in FIG. 14, illustrating the purge control valve disposed in the cover member and also illustrating an improved arrangement of polyurethane foam pads which retain the charcoal in the canister.

DETAILED DESCRIPTION OF THE PREFERRED EMBODIMENT

Figure 11:
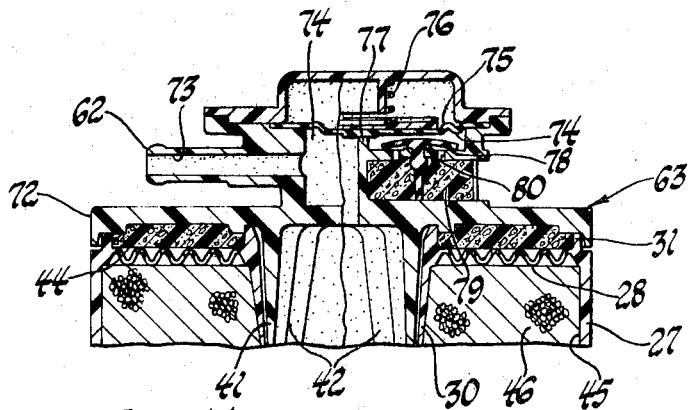
FIG. 11 is an enlarged sectional view of the top portion of the canister, taken generally along line 11—11 of FIG. 10a, showing the pressure and vacuum control valves disposed in the cover member.

Referring first to the system of FIG. 1, a vehicle fuel tank or reservoir 10 has a plurality of vent lines 11 and 12 extending to a liquid-vapor separator 13. Fuel vapor emitted from tank 10 passes through vent lines 11, 12, separator 13, and a vent line 14 and is received by a fitting 15 (FIG. 3) of a canister assembly 16. Canister 16 contains an adsorbent which stores the fuel vapor therein. Another fitting 17 (FIG. 3) on canister 16 is connected through a purge line 18 to the engine induction passage 19 at a port 20 disposed below the throttle 21. Air flow is thereby induced through the canister during engine operation to purge the fuel vapor from the adsorbent. As shown in FIG. 3, fitting 17 contains a restricting orifice 22 whereby the flow through purge line 18 is maintained at a low rate. Another fitting 23 (FIG. 3) on canister 16 is connected through a purge line 24 to the snorkel 25 of the engine air cleaner 26; additional purge air flow is thereby induced through canister 16 by the varying vacuum conditions which are created as induction air flows through snorkel 25.

As may be seen in FIG. 2, the body portion of canister 16, molded from heat stabilized nylon, has a generally cylindrical side wall 2 and an upper end wall comprising an annular outer portion 28 and an inner portion 29 connected by a concentrically disposed, upwardly opening, generally frusto-conical or cylindrical inner wall 30. A sealing lip 31 extends upwardly around the perimeter of annular portion 28.

As may be seen in figs. 4 and 5, outer wall 28 is formed in a gridded structure having a plurality of flat ribs 32 extending radially from inner wall 30 to sealing lip 31 and spaced circumferentially about inner wall 30 and a plurality of undulating ribs 33 also extending radially from inner wall 30 to sealing lip 31 between flat ribs 32 with a circumferential dimension substantially equal to the circumferential spacing between flat ribs 32. The peak portions 34 of undulating ribs 33 are disposed at the same height as flat ribs 32, and the valley portions 35 of undulating ribs 33 are disposed lower than flat ribs 32. A plurality of circular ribs 36 are spaced between inner wall 30 and outer wall 31 and interconnect peak portions 34 of undulating ribs 33 with flat ribs 32. The grid formed by flat ribs 32, undulating ribs 33, and circular ribs 36 defines a plurality of apertures 37 (FIG. 5) which open horizontally from spaces above the valley portions 35 of undulating ribs 33 and between circular ribs 36 to spaces below flat ribs 32 and between circular ribs 36.

Inner wall 29 has a similar grid structure comprised of flat ribs 38, undulating ribs 39, and cross ribs which interconnect the peak portions of undulating ribs 39 with flat ribs 38. A separate sectional view of the grid structure for inner wall 29 is not presented since its features are adequately shown in the grid illustration of FIG. 5.

A cover member 40, molded of heat stabilized nylon, is secured to inner wall 30 and sealing lip 31. Cover member 40 includes fittings 15, 17, and 23 and a depending cylindrical wall 41 extending within inner wall 30. Depending wall 41 has a plurality of ribs 42 which retain a polyurethane filter pad 43 against inner gridded wall 29 within the chamber defined by gridded wall 29, inner wall 30, and cover member 40. An annular polyurethane filter pad 44 is retained within the chamber defined by cover member 40, annular gridded wall 28, inner wall 30, and sealing lip 31.

The chamber 45 formed within canister assembly 16 contains a quantity of activated charcoal or carbon 46 which has the property of adsorbing fuel vapor. Charcoal 46 is maintained within canister assembly 16 in a tightly packed condition by a lower wall or closure member 47 and a fine mesh nylon screen 48, both shown and described below in greater detail the reference to FIGS. 6 and 7. Lower wall 47 has an upward bias applied by a wave spring 49 shown in FIG. 8. A base member 50, molded from heat stabilized nylon and secured to the lower end of side wall 27, has an annular shoulder 51 extending inwardly from side wall 27 which defines a central opening 52 bisected by a bar 53. Shoulder 51 supports wave spring 49 and, in conjunction with bar 53, also supports a polyurethane filter pad 54 which filters air entering the base of the canister.

As shown in greater detail in FIGS. 6 and 7, lower wall member 47, also molded from heat stabilized nylon, has a gridded structure comprising a plurality of circular ribs 55 and a plurality of radially extending ribs 56. As may be seen in FIG. 7, the base 57 of radial ribs 56 is flat while the upper surface 58 of ribs 56 has an undulating form in which the peak portions 59 are disposed intermediate circular ribs 55 and the valley portions 60 occur at circular ribs 55.

A sealing lip 61 formed on lower wall member 47 is resiliently biased outwardly to engage outer wall 27 as shown in FIG. 2.

Figure 10A:
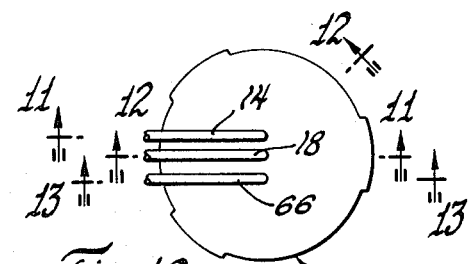
FIG. 10a is a schematic plan view of the canister shown in FIG. 10, indicating how the views of FIGS. 11, 12 and 13 are taken.
Figure 24:
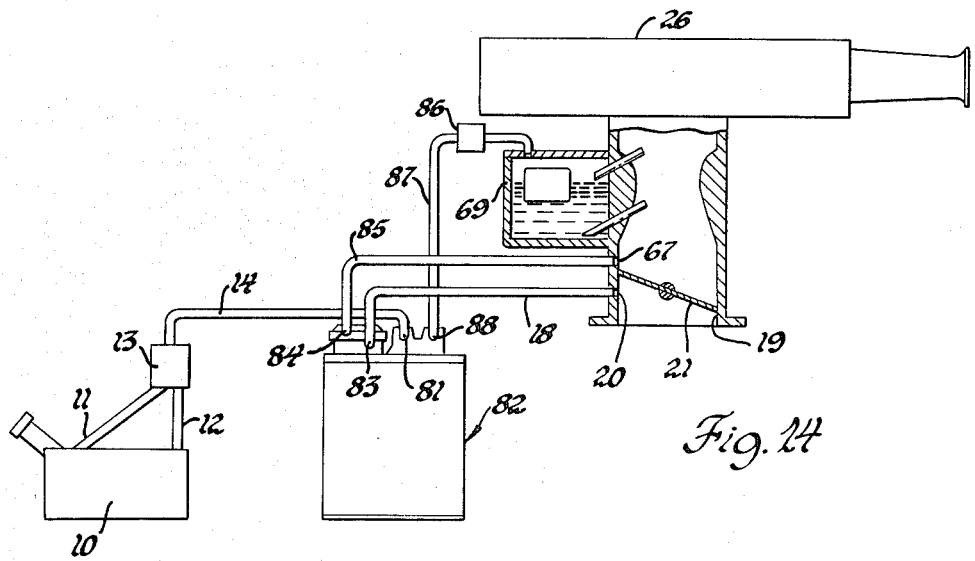
Figure 25:
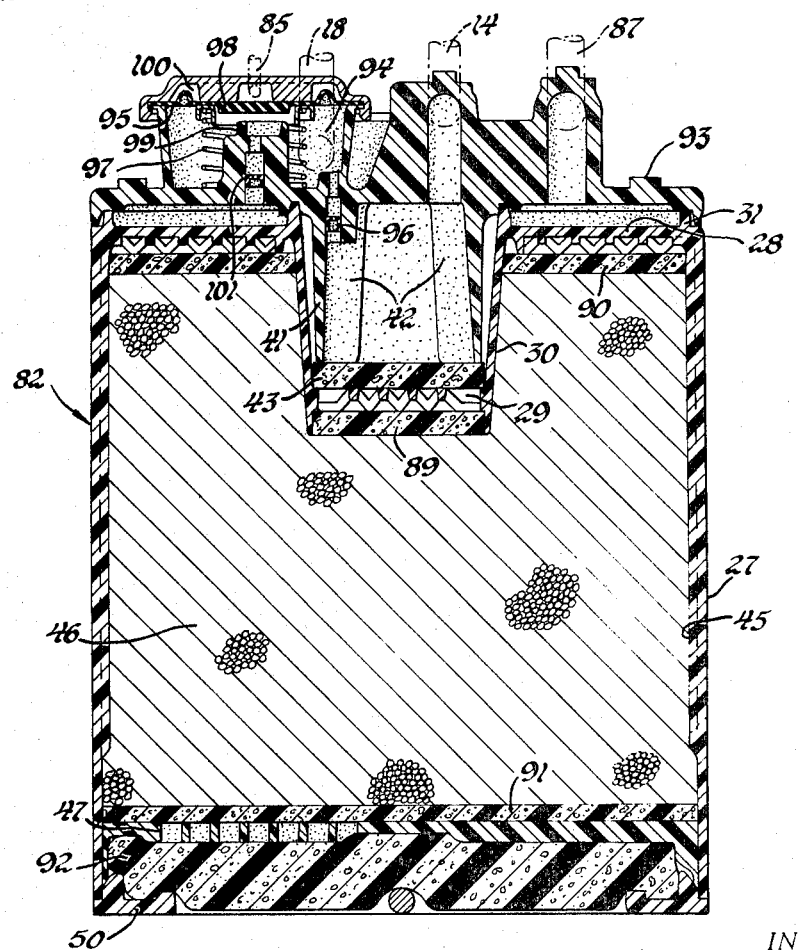

FIG. 10 shows another system utilizing the features of canister 16. The same reference numerals are used to designate the same components in each system. Referring to FIG. 10, a vehicle fuel tank 10 has a plurality of vent lines 11,12 which extend to a liquid-vapor separator 13. A vent line 14 directs fuel vapor from separator 13 to a fitting 62 (FIG. 11) of a canister assembly 63 which contains a fuel vapor adsorbent. Another fitting 64 (FIG. 12) on canister 63 has a purge line 18 extending to the engine induction passage 19 at a location 20 below the throttle 21. Air flow is thereby induced through the canister during engine operation to purge the fuel vapor from the adsorbent. An additional fitting 65 (FIG. 13) on canister 63 has a purge line 66 extending to induction passage 19 at a port 67; port 67 is located upstream of throttle 21 when throttle 21 is closed and is traversed by throttle 21 as throttle 21 is opened. Port 67 is thereby subjected to the vacuum conditions below throttle 21 during open throttle operation and induces an additional purge air flow through canister 63 during open throttle operation.

A valve structure indicated generally by 68 connects the carburetor fuel bowl 69 with the engine air cleaner 26 on the clean side of the filter element 70 during engine operation and connects carburetor fuel bowl 69 through a vent line 71 to purge line 66 when the engine is not operating; thus fuel vapors formed in fuel bowl 69 when the engine is not operating are vented through lines 71 and 66 to canister 63. The body and lower portions of canister assembly 63 are identical to those of canister assembly 16; only the cover members differ.

Figure 12:
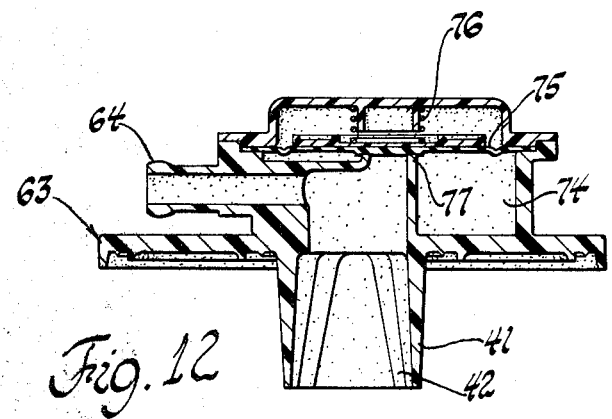
FIG. 12 is a sectional view taken along line 12—12 of FIG. 10a showing one purge fitting.
Figure 13:
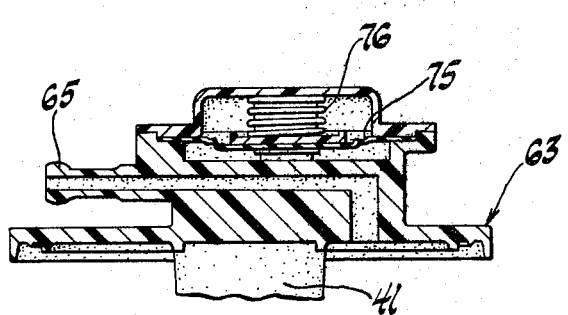
FIG. 13 is a sectional view taken along line 13—13 of FIG. 10a showing the second purge fitting.

Referring to FIGS. 11, 12 and 13, the cover member 72 for canister 63 sealingly engages inner wall 30 and sealing lip 31 and has a depending wall 41 provided with ribs 42. A passage 73 extending through fitting 62 opens into a chamber 74 beneath a diaphragm type valve member 75. As fuel vapor pressure in tank 10, vent line 14, passage 73 and chamber 74 increases, valve member 75 is raised against the bias of its spring 76 so that fuel vapor may flow through valve seat 77 to the charcoal 46.

An umbrella valve member 78 responds to a predetermined reduction in pressure in tank 10, vent line 14, passage 73, and chamber 74, opening to permit air flow through a polyurethane filter pad 79 and a plurality of orifices 80 to chamber 74 and thus through passage 73 and vent line 14 to tank 10.

FIG. 14 shows an additional system utilizing a canister similar to canister 16. The same reference numerals are used to designate the same components in each system. Referring to FIG. 14, a vehicle fuel tank 10 has a plurality of vent lines 11,12 which extend to a liquid-vapor separator 13. A vent line 14 directs fuel vapor from separator 13 to a fitting 81 of a canister assembly 82 which contains a fuel vapor adsorbent. Another fitting 83 has a purge line 18 extending to the engine induction passage 19 at a location 20 below the throttle 21. An additional fitting 84 has a vacuum signal line 85 extending to induction passage 19 at a port 67 located upstream of throttle 21 when throttle 21 is closed and traversed by throttle 21 as throttle 21 is opened; port 67 is thereby subjected to the vacuum conditions below throttle 21 during open throttle operation.

A valve structure indicated generally by 86 is opened through linkage (not shown) from throttle 21 whenever throttle 21 is closed; fuel vapors formed in fuel bowl 69 are then vented through a vapor line 87 to a fitting 88 on canister 82.

The body portion of canister 82 is identical to the body portion of canister 16 and will not be described further. A body of fuel vapor adsorbing charcoal 46 is retained in canister 82 between a central polyurethane filter pad 89 and an annular polyurethane filter pad 90, both at the top of canister 82, and a polyurethane filter pad 91 at the bottom of canister 82. During assembly, the gridded lower wall or closure member 47, identical to that used in canister 16, squeezes charcoal 46 and polyurethane pads 89, 90 and 91 to tightly pack the charcoal and compress the polyurethane pads. Lower wall 47 is then secured in place, and any subsequent tendency of charcoal 46 to compact is compensated by expansion of polyurethane pads 89, 90 and 91. Charcoal 46 is thus maintained in a tightly packed condition without the wave spring 49 used in canister 16. A base member 50, identical to that used in canister 16, supports a fiberglass pad 92 which filters air entering the base of the canister.

A cover member 93, molded of heat stabilized nylon, is secured to the inner wall 30 and the sealing lip 31 at the top of the canister body. Cover member 93 includes fittings 81, 83, 84, and 88 and has a depending wall 41 extending within inner wall 30. A plurality of ribs 42, extending inwardly from wall 41, retain a polyurethane filter pad 43 against the inner gridded wall 29 within the chamber defined by gridded wall 29, inner wall 30, and cover member 93.

Cover member 93 includes a purge control unit to which lines 18 and 85 are connected through fittings 83 and 84 respectively. Under closed throttle conditions of operation, manifold vacuum is applied through line 18 to a chamber 94 below a diaphragm 95. This induces a flow of air into the base of canister 82 and through filter 92, charcoal 46, central gridded wall 29, and a restriction 96. This air flow purges adsorbed fuel vapor from charcoal 46 and delivers it through purge line 18 to induction passage 19 for combustion in the engine. Restriction 96 maintains this flow at a low rate.

During closed throttle operation, the vacuum in chamber 94 pulls diaphragm 95 downwardly against a spring 97, and a valve 98 formed as a portion of diaphragm 95 engages an annular valve seat 99. When throttle 21 is opened, port 67 senses the vacuum therebelow and applies this vacuum through vacuum signal line 85 to a chamber 100 above diaphragm 95. The pressures on opposite sides of diaphragm 95 are thereby equalized, and spring 97 lifts valve 98 away from seat 99. The vacuum in chamber 94 then induces an additional purge air flow into the base of canister 82 and through filter 92, charcoal 46, annular gridded wall 28, and a restriction 101.

OPERATION

It will be noted that, in each embodiment, fuel vapor emitted from tank 10 enters the canister through inner gridded wall 29 near the mid-portion of the canister, at a location axially removed from annular gridded wall 28. The vapor is dispersed downwardly through charcoal 46 both by gravitational force and by the difference between the fuel vapor pressure and the atmospheric pressure ambient the lower end of the canister. Moreover, in each embodiment, purge vacuum created during engine operation is applied through annular gridded wall 28 and draws air through the lower filter pad and charcoal 46, thus purging fuel vapor from charcoal 46. The quantity of charcoal 46 located in the annulus about inner wall 30 smoothes the flow of fuel vapor in the purge air stream. The lower filter pads 54 or 92 prevent dust from entering charcoal 46 and, in conjunction with nylon screen 48 or polyurethane pad 91 and the grid structure of lower wall member 47, also prevents carbon particles from dropping out of the canister assembly. The annular polyurethane pads 44 or 90, in conjunction with annular gridded wall 28, prevent carbon particles from being drawn into the engine induction system.

Also during engine operation, engine vacuum applied from port 20 through fittings 17, 64, or 83 purges fuel vapor directly from fuel tank 10 through vent line 14 and purges fuel vapor from charcoal 46 by drawing air through the lower filter pads 54 or 90 and charcoal 46. The polyurethane pads 43 and 89, in conjunction with inner gridded wall 29, also prevent carbon particles from being drawn into the induction system.

Construction of the canister assembly with the fuel vapor inlet and purge fittings at the top and the atmospheric opening at the bottom not only permits ready dispersion of fuel vapor through the charcoal but additionally permits discharge of any fuel that may be unexpectedly delivered to the canister assembly beyond the storage capacity of the charcoal. Fuel discharged from the bottom of the canister may be ducted to a remote location in some circumstances.

It will be appreciated that other systems may utilize the features of the canister described above; in the FIG. 2 embodiment, for example, the purge flow provided by vent line 18 is unnecessary in some systems and fitting 17 is then plugged or eliminated entirely.

We Claim:

1. A canister for use in a system for controlling loss of fuel vapor from a vehicle having a fuel reservoir and an internal combustion engine with an induction passage, said canister comprising means forming a generally cylindrical side wall and a pair of oppositely disposed end walls which define a chamber therewithin, one of said end walls having a central portion and an outer annular portion with said central portion disposed closer to the other of said end walls than said outer portion and connected to said outer portion by a generally cylindrical portion, a quantity of fuel vapor adsorbing material filling said chamber, fuel vapor inlet means connected to said central portion and adapted for connection to said reservoir whereby fuel vapor emitted from said reservoir may be dispersed into said adsorbing material from a mid-portion thereof, and fuel vapor outlet means connected to said outer portion and adapted for connection to said induction passage whereby fuel vapor may be purged from said adsorbing material to said induction passage through an area surrounding said midportion and axially removed therefrom.

2. The canister of claim 1 which further comprises additional fuel vapor outlet means connected to said central portion and adapted for connection to said induction passage whereby fuel vapor also may be purged from said mid-portion of said adsorbing material to said induction passage and directly from said reservoir to said induction passage.

3. The canister of claim 1 wherein said end walls are molded from a plastic material and comprise grids permitting fluid flow to and from said adsorbing material but preventing loss of said adsorbing material form said chamber.

4. The canister of claim 3 which further comprises filter means overlying said grids for preventing entrance of dust to said chamber and loss of said adsorbing material from said chamber.

5. A canister for use in a system for controlling loss of fuel vapor from a vehicle having a fuel reservoir and an internal combustion engine with an induction passage, said canister comprising a molded plastic body member having a generally cylindrical side wall with a vertical axis, an annular end wall intersecting said side wall at its upper end and extending inwardly therefrom, said end wall being molded in a grid defining a plurality of apertures extending therethrough, said end wall having an upwardly extending sealing lip circumscribing said grid, an upwardly opening generally frusto-conical inner wall disposed concentrically about said axis and intersecting said end wall and extending upwardly and downwardly therefrom, and an inner grid disposed at the lower end of said inner wall, said inner grid defining a plurality of apertures extending therethrough, a quantity of fuel vapor adsorbing material contained in the portion of said body member immediately below said annular end wall grid and said inner grid and surrounding the portion of said inner wall below said end wall, and a molded plastic cover member secured over said body member and engaging said sealing lip and said inner wall to define an annular chamber above said annular end wall grid and an inner chamber above said inner grid, said cover member having an inlet fitting opening to said inner chamber and adapted for connection to said fuel reservoir and a purge fitting opening from said annular chamber and adapted for connection to said induction system whereby fuel vapor emitted from said reservoir may be dispersed into said adsorbing material from a mid-portion thereof and whereby fuel vapor may be purged from said adsorbing material to said induction system through an area surrounding said midportion and axially removed therefrom.

6. The canister of claim 5 wherein said body member and said cover member are molded from heat stabilized nylon.

7. The canister of claim 5 wherein said annular end wall grid is formed by a plurality of flat ribs extending radially from said inner wall to said sealing lip and spaced circumferentially about said inner wall, a plurality of undulating ribs also extending radially from said inner wall to said sealing lip between said flat ribs and having a circumferential dimension substantially equal to the circumferential spacing between said flat ribs, said undulating ribs having peak portions disposed at the same height as said flat ribs and valley portions disposed lower than said flat ribs, and a plurality of circular ribs spaced between said inner wall and said sealing lip and interconnecting said peak portions of said undulating ribs with said flat ribs, whereby said apertures extending through said end wall grid are defined to open horizontally from spaces above said valley portions and between said circular ribs to spaces below said flat ribs and between said circular ribs.

8. The canister of claim 5 wherein said inner wall grid is defined by a plurality of spaced parallel flat ribs, a plurality of parallel undulating ribs disposed between said flat ribs and having a width substantially equal to the spacing between said flat ribs, said undulating ribs having peak portions disposed at the same height as said flat ribs and valley portions disposed lower than said flat ribs, and a plurality of cross ribs extending perpendicular to said flat and undulating ribs and interconnecting said peak portions of said undulating ribs with said flat ribs, whereby said apertures extending through said inner wall grid are defined to open horizontally from spaces above said valley portions and between said cross ribs to spaces below said flat ribs and between said cross ribs.

9. A canister for use in a system for controlling loss of fuel vapor from a fuel reservoir, said canister comprising means forming a generally cylindrical side wall and an end wall which define a chamber open at one end, fuel vapor inlet means opening into said chamber and adapted for connection to said reservoir whereby fuel vapor emitted from said reservoir may be conducted to said chamber, a quantity of fuel vapor adsorbing material disposed within said chamber, means forming a closure disposed adjacent said open end of said chamber and having its circumference slidably engaging said side wall, and spring means biasing said closure forming means toward said end wall whereby said adsorbing material is retained in a tightly packed manner therebetween.

10. The canister of claim 9 which further comprises an annular spring seat portion extending inwardly from said side wall at said open end of said chamber and overlapping said circumference of said closure forming means, and wherein said spring means comprises a wave spring disposed between said spring seat portion and said closure forming means.

11. A canister for use in a system for controlling loss of fuel vapor from a fuel reservoir, said canister comprising means forming a generally cylindrical side wall and an end wall which define a chamber open at one end, fuel vapor inlet means opening into said chamber and adapted for connection to said reservoir whereby fuel vapor emitted from said reservoir may be conducted to said chamber, a quantity of fuel vapor adsorbing material disposed within said chamber, means forming a closure disposed adjacent said open end of said chamber, and compressed polyurethane pads disposed between said adsorbing material and said end wall and said closure to retain said adsorbing material in a tightly packed manner therebetween.

12. A canister for use in a system for controlling loss of fuel vapor from a vehicle having a fuel reservoir and an internal combustion engine with an induction passage, said canister comprising a molded plastic body member having a generally cylindrical side wall with a vertical axis, an annular end wall intersecting said side wall at its upper end and extending inwardly therefrom, said end wall being molded in a grid defining a plurality of apertures extending therethrough, said end wall having an upwardly extending sealing lip circumscribing said grid, an upwardly opening generally frusto-conical inner wall disposed concentrically about said axis and intersecting said end wall and extending upwardly and downwardly therefrom, and an inner grid disposed at the lower end of said inner wall, said inner grid defining a plurality of apertures extending therethrough, an annular polyurethane filter pad overlying said annular end wall grid, an inner polyurethane filter pad overlying said inner grid, a molded plastic cover member secured over said body member and engaging said sealing lip and said inner wall to define an annular chamber containing said annular filter pad and an inner chamber containing said inner filter pad, said cover member having an inlet fitting opening to said inner chamber and adapted for connection to said fuel reservoir and a purge fitting opening from said annular chamber and adapted for connection to said induction system, a quantity of fuel vapor adsorbing material contained in the portion of said body member immediately below said annular end wall grid and said inner grid and surrounding the portion of said inner wall below said end wall, a fine mesh nylon screen underlying said adsorbing material, a molded plastic lower wall member underlying and supporting said screen and said adsorbing material, said lower wall member being molded in a grid defining a plurality of apertures therethrough, said lower wall member having a depending skirt biased into engagement with said side wall, a lower filter pad underlying said lower wall member grid, a molded plastic base member secured to the lower end of said side wall, said base member having an annular shoulder extending inwardly from said side wall and defining a central opening and having a bar extending diametrically across said opening to divide said opening into two portions, said shoulder and said bar supporting said lower filter pad, and a wave spring member supported on said shoulder and biasing said lower wall member upwardly against said adsorbing material to retain said material in a tightly packed condition.

13. A canister for use in a system for controlling loss of fuel vapor from a vehicle having a fuel reservoir and an internal combustion engine with an induction passage, said canister comprising a molded plastic body member having a generally cylindrical side wall with a vertical axis, an annular end wall intersecting said side wall at its upper end and extending inwardly therefrom, said end wall being molded in a grid defining a plurality of apertures extending therethrough, said end wall having an upwardly extending sealing lip circumscribing said grid, an upwardly opening generally frustoconical inner wall disposed concentrically about said axis and intersecting said end wall and extending upwardly and downwardly therefrom, and an inner grid disposed at the lower end of said inner wall, said inner grid defining a plurality of apertures extending therethrough, a molded plastic cover member secured over said body member and engaging said sealing lip and said inner wall to define an annular chamber above said annular end wall grid and an inner chamber above said inner grid, said cover member having an inlet fitting opening to said inner chamber and adapted for connection to said fuel reservoir and a purge fitting opening from said annular chamber and adapted fro connection to said induction system, a quantity of fuel vapor adsorbing material contained in the portion of said body member below said annular end wall grid and said inner grid and surrounding the portion of said inner wall below said end wall, a molded plastic lower wall member underlying and supporting said adsorbing material, said lower wall member secured to said side wall and being molded in a grid defining a plurality of apertures therethrough, a compressed annular polyurethane filter pad disposed between said annular end wall grid and said adsorbing material, a compressed inner polyurethane filter pad disposed between said inner grid and said adsorbing material, a compressed lower polyurethane pad disposed between said adsorbing material and said lower wall member, the compression of said polyurethane pads retaining said adsorbing material in a tightly packed manner, an air filter pad underlying said lower wall member grid, and a molded plastic base member secured to the lower end of said side wall, said base member having an annular shoulder extending inwardly from said side wall and defining a central opening and having a bar extending diametrically across said opening to divide said opening into two portions, said shoulder and said bar supporting said air filter pad.

* * * * *